United States Patent
Brucker

(10) Patent No.: US 6,199,896 B1
(45) Date of Patent: Mar. 13, 2001

(54) GAS BAG MODULE FOR A VEHICLE OCCUPANT RESTRAINT SYSTEM AND METHOD FOR PRODUCING A GAS BAG MODULE

(75) Inventor: Roland Brucker, Schwäbisch Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/293,812

(22) Filed: Apr. 16, 1999

(30) Foreign Application Priority Data

Apr. 20, 1998 (DE) .......................................... 298 07 098 U

(51) Int. Cl.$^7$ .................................................. B60R 21/20
(52) U.S. Cl. .................................. 280/728.2; 280/728.3; 280/740
(58) Field of Search ............................. 280/728.2, 730.1, 280/730.2, 732, 740, 728.3

(56) References Cited

U.S. PATENT DOCUMENTS

| 5,358,270 | * | 10/1994 | Kuretake et al. | 280/728.2 |
| 5,609,354 | * | 3/1997 | Lauritzen et al. | 280/728.2 |
| 5,645,295 | * | 7/1997 | White, Jr. et al. | 280/730.2 |
| 5,687,987 | * | 11/1997 | Spencer et al. | 280/728.2 |
| 5,791,683 | * | 8/1998 | Shibata et al. | 280/730.1 |
| 5,884,937 | * | 3/1999 | Yamada | 280/730.2 |

FOREIGN PATENT DOCUMENTS

| 297 02 008 U | 5/1997 | (DE) . |
| 19700759 | 1/1998 | (DE) . |
| 297 18 305 U | 3/1998 | (DE) . |
| 297 18 205 U | 4/1998 | (DE) . |

* cited by examiner

*Primary Examiner*—Peter C. English
(74) *Attorney, Agent, or Firm*—Tarolli, Sundheim, Covell, Tummino & Szabo L.L.P.

(57) ABSTRACT

A gas bag module for a vehicle occupant restraint system comprises an elongated housing which consists of two side pieces and in which a flow channel for compressed gas is provided, a gas bag which can be transferred by the compressed gas from a folded position into an unfolded position and which is accommodated in the housing in its unfolded position, and a closure plate constructed in one piece with one of the side pieces. The flow channel is formed by the side pieces of the housing and by the closure plate. The closure plate has passages for the compressed gas. Further, a method or producing a gas bag module is provided wherein the flow channel is formed by bending a cast or injection molded plastic housing.

19 Claims, 5 Drawing Sheets

GAS BAG MODULE FOR A VEHICLE OCCUPANT RESTRAINT SYSTEM AND METHOD FOR PRODUCING A GAS BAG MODULE

TECHNICAL FIELD

The invention relates to a gas bag module for a vehicle occupant restraint system and to a method for producing a gas bag module.

BACKGROUND OF THE INVENTION

In the unfolded state, the gas bag can provide a protective effect for a vehicle occupant, for example in the case of an accident. For this purpose, the gas bag module is connected with a gas generator which can be activated by a suitable triggering system, when the latter detects the necessity to transfer the gas bag into the unfolded position.

In elongated housings, the problem basically exists of introducing the compressed gas, provided by the gas generator, uniformly into the gas bag. Usually, a gas lance is used as flow channel, which lance is connected with the gas generator and extends through the housing. Several outflow openings are provided in the gas lance, which make possible the entry of the compressed gas into the gas bag.

The use of such a gas lance leads to various disadvantages. On the one hand, the gas lance represents an additional part which has to be produced, handled and mounted. This results in increased costs. In addition, the introduction of the gas lance into the housing and into the gas bag causes problems because the gas bag must not be damaged under any circumstances on introduction of the gas lance.

BRIEF SUMMARY OF THE INVENTION

The object of the invention consists in providing a gas bag module of the type initially mentioned, in which the installation of the gas bag module is simplified.

The gas bag module according to the present invention comprises an elongated housing which consists of two side pieces and in which a flow channel for compressed gas is provided, a gas bag which can be transferred by the compressed gas from a folded position into an unfolded position and which is accommodated in the housing in its unfolded position, and a closure plate constructed in one piece with one of the side pieces. The flow channel is formed by the side pieces of the housing and by the closure plate. The closure plate has passages for the compressed gas. In this construction, the flow channel is therefore not formed by the gas lance, which is constructed as a separate component, but rather by constructions which are part of the housing itself. In this way, the introduction of the gas lance into the housing is dispensed with.

A further important feature of the invention is the simple producibility of the housing. With the housing according to the invention, which is molded or cast from plastic, closed profiles (as seen in cross-section) are no longer provided for the resulting molded or cast part which would make the molding or casting very expensive. As, however, there is to be provided a closed profile for the formation of the flow channel, this profile is formed by bending the molded or cast part and by subsequent connection of the bent sections to each other. The housing may be molded or cast so to speak in one plane. The side pieces essentially form a plane, from which for example only the closure plate protrudes essentially perpendicularly. By bending and fixing the side piece, to which the closure plate is not attached, to the closure plate, the profile closed in circumferential direction and, thus, a hollow body are generated, the latter forming the flow channel.

The invention relates in addition to a method for producing a gas bag module according to the invention, which module is characterized by its simple and cost-effective production. For this, the following steps are provided:

a) the housing is molded or cast from plastic in such a way that no closed profiles are provided in the readily produced injection molded or cast part, b) the folded gas bag is inserted into the open housing, c) the housing is closed, the flow channel being likewise closed by the closing action, and d) the side pieces lying opposite each other by the closing action are connected to each other in such a way that they are kept to constant distance.

Preferably, a chamber for accommodating the gas bag is likewise closed by the closing action.

DETAILED DESCRIPTION OF PREFERRED EMBODIMENTS

Figure 1:
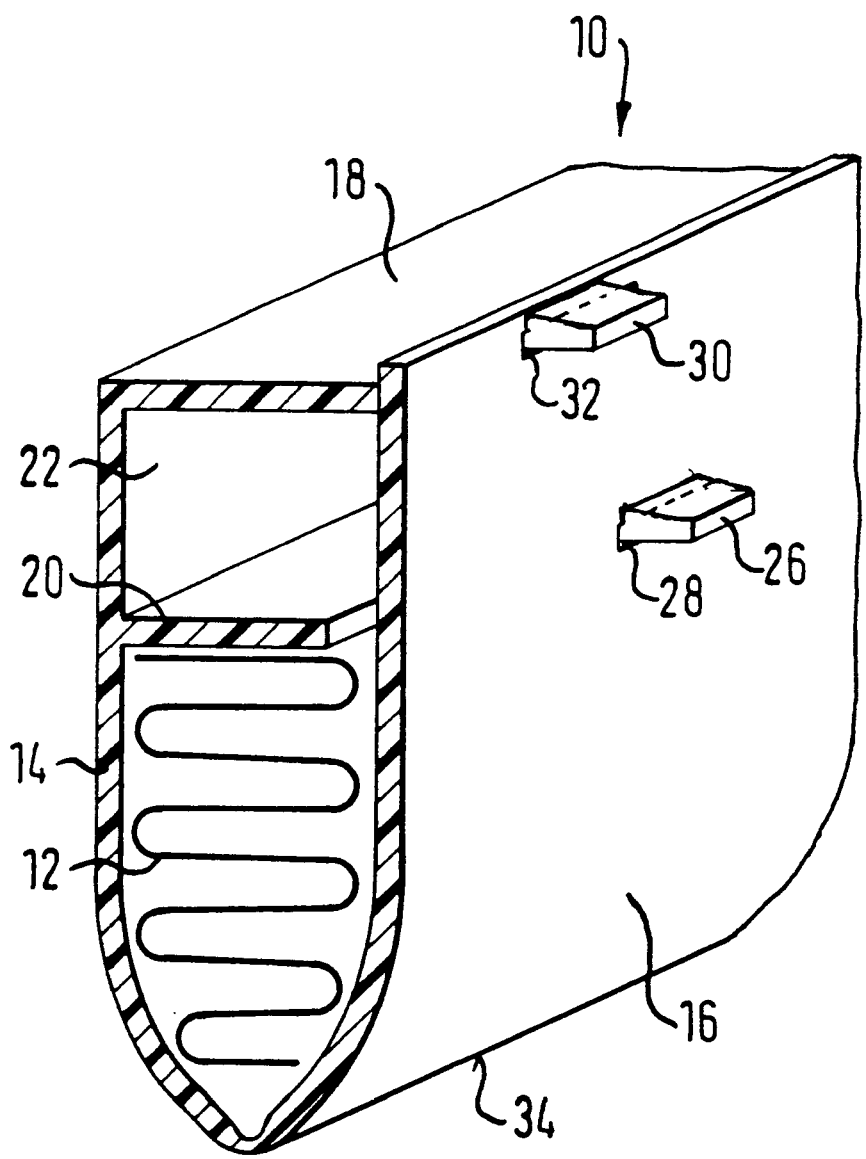
FIG. 1 shows in a broken and sectional perspective view a gas bag module according to a first embodiment of the invention, with folded gas bag.
Figure 2:
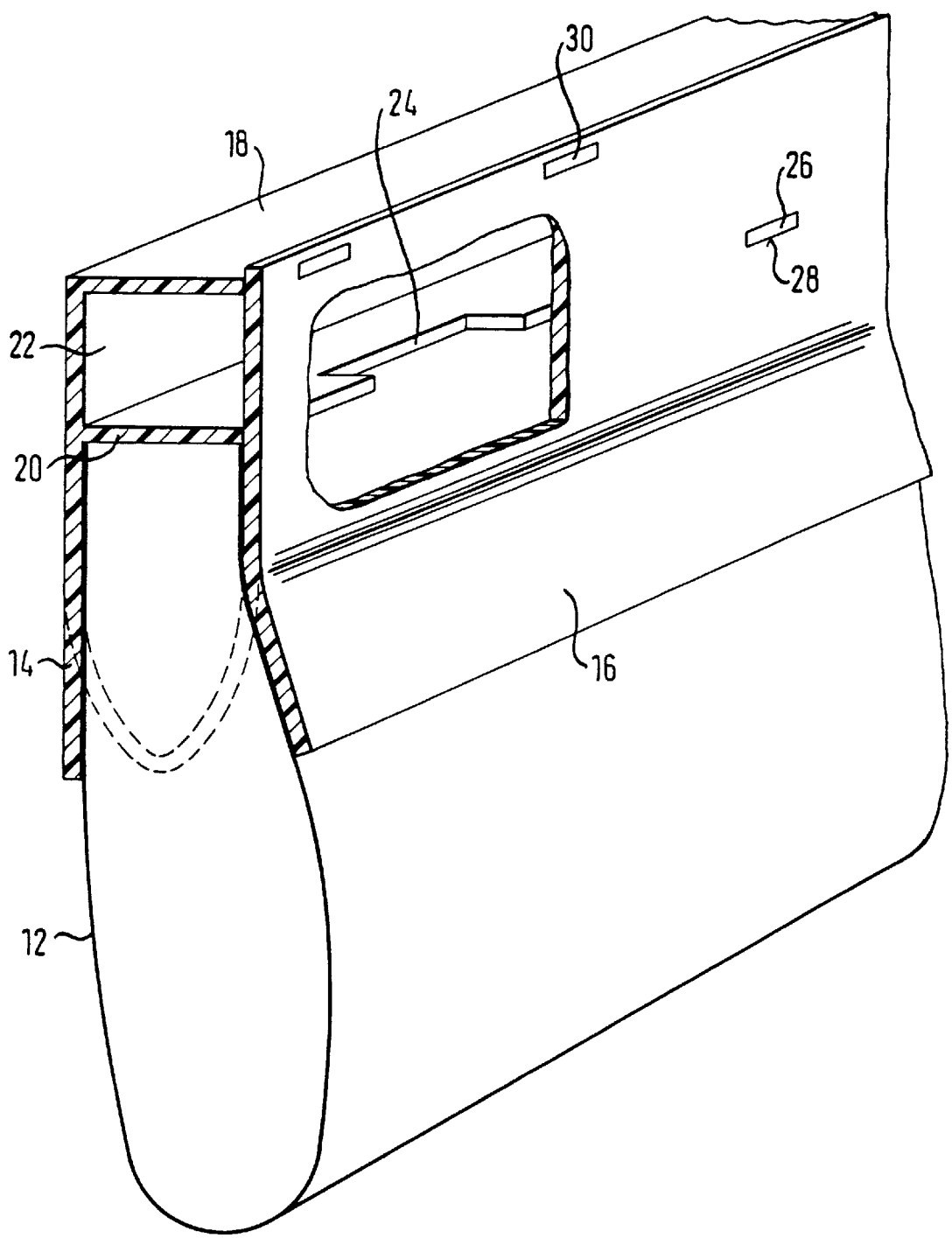
FIG. 2 shows the gas bag module of FIG. 1 with unfolded gas bag.
Figure 3:
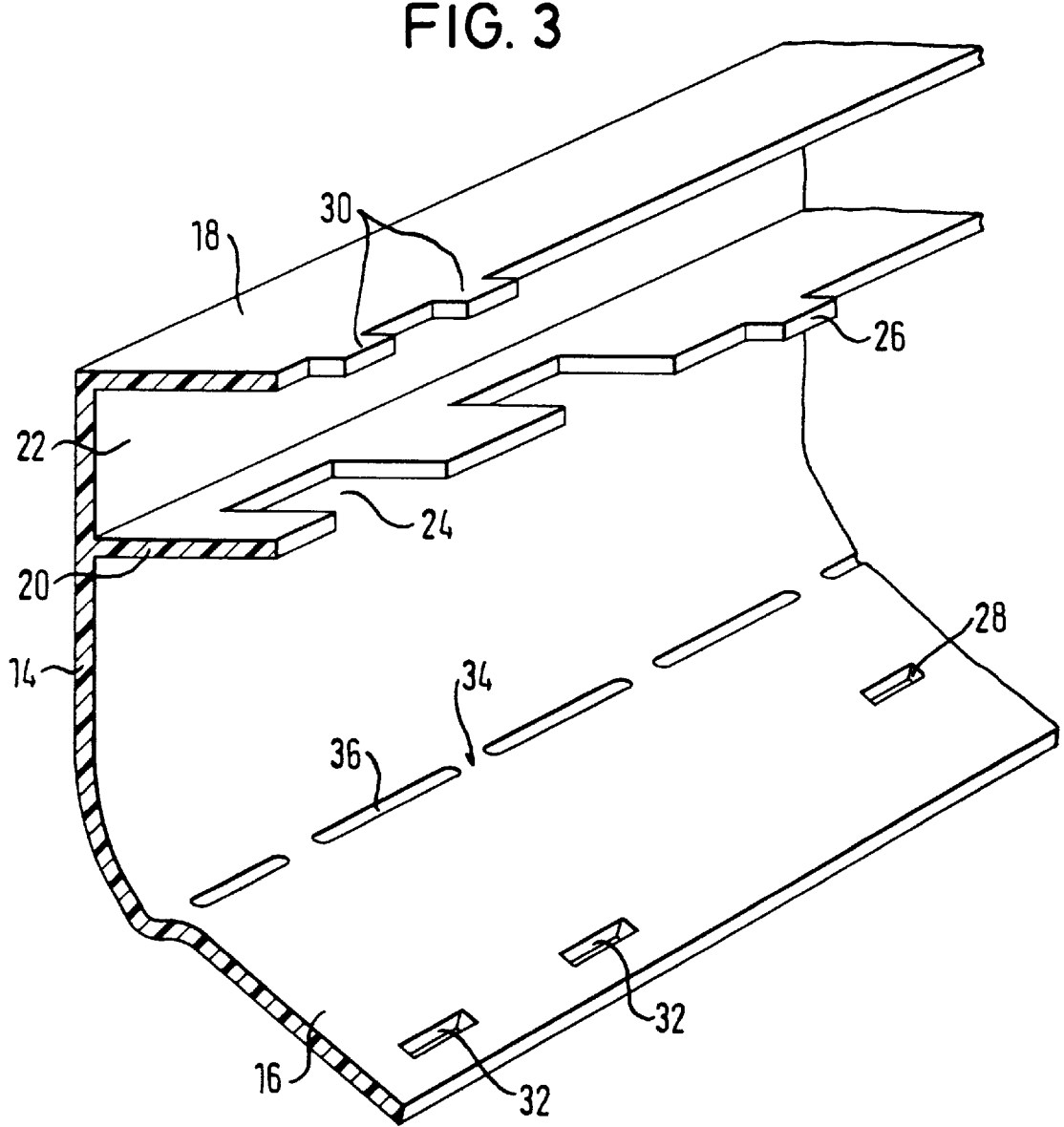
FIG. 3 shows in a broken and sectional perspective view an opened housing which is used in the gas bag module of FIG. 1.

In FIG. 1 a gas bag module according to a first embodiment of the invention is shown. The gas bag module contains a housing 10, in which a gas bag 12, illustrated only diagrammatically, is arranged folded together and which completely surrounds the gas bag 12 in the folded condition. The housing 10 contains two side pieces 14, 16 and also a cover 18 which is constructed as a part of the side piece 14 in one piece therewith (see also FIG. 3). The side piece 14 is additionally provided with a closure plate 20 which together with the cover 18 and the two side pieces 14, 16 delimits a flow channel 22 for compressed gas, by means of which the gas bag 12 can be transferred from the folded position into the unfolded position shown in FIG. 2. Passages 24 are provided in the closure plate (see FIG. 3), which make possible the overflowing of the compressed gas from the flow channel 22 into the gas bag 12. The gas bag 12 is accommodated in a closed chamber of the housing 10, which chamber is limited by the side pieces 14, 16 and the closure plate 20.

The closure plate 20 is provided with projections 26 which engage into openings 28 constructed in the side piece 16. In addition, the cover 18 is provided with projections 30 which engage in openings 32 which are constructed in the side piece 16. The projections 26, 30 can be connected with the side piece 18 in any desired suitable manner, for example by clipping, welding, riveting, etc. Thereby, the two side pieces 14, 16 are firmly connected with each other in the region of the flow channel 22. In FIG. 1 there is indicated a clip connection in which the projections 26, 30 have hook-shaped ends. For reasons of simplifying the drawings, these hook-shaped ends are no longer illustrated in the remaining Figures.

On the side of the gas bag 12 facing away from the flow channel 22, the two side pieces 14, 16 are connected with each other in one piece. For this purpose, a bending line 34 is provided, which is formed by a plurality of sites of weakened material 36. These sites of weakened material 36 define a tear line, along which the two side pieces 14, 16 can be separated from each other in order to make possible the unfolding of the gas bag. This state of the gas bag module with unfolded gas bag 12 and side pieces 14, 16 separated from each other is to be seen in FIG. 2.

Figure 4:
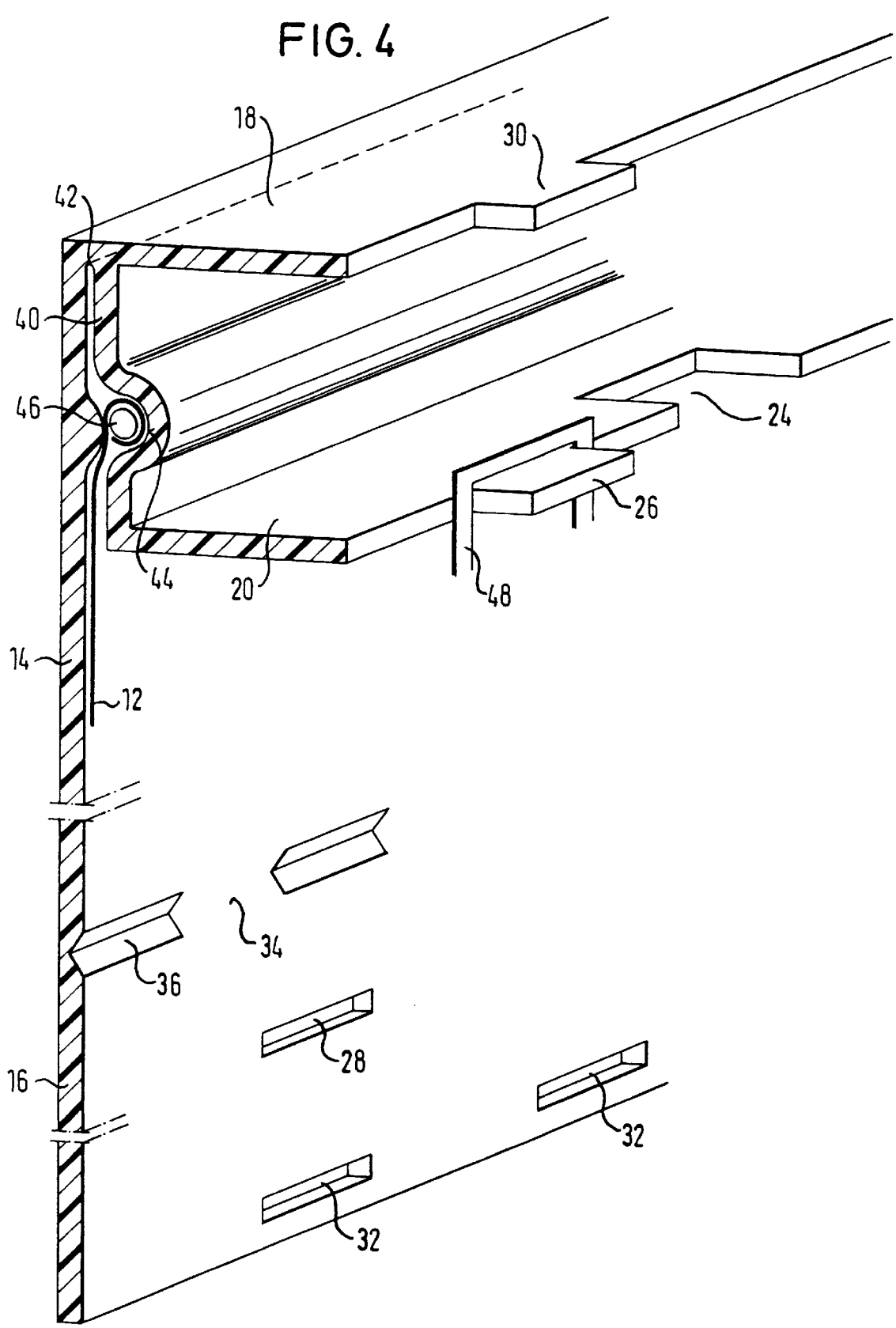
FIG. 4 shows in a broken and sectional perspective view a housing according to a variant which can be used in the gas bag module of FIG. 1.

In FIG. 4 a variant is shown of the housing for a gas bag module according to the first embodiment. In this variant, a fixing plate 40 is provided which is connected in one piece with the side piece 14 along a bending line 42. The fixing plate has a groove 44, in which a bead 46 is held which is provided along the edge of the gas bag 12. The gas bag 12 is additionally provided with tongues 48 which are slipped over the projections 26 of the closure plate 20.

With the aid of the variant of FIG. 4, it can be seen that the housing 10 can be produced in a particularly simple manner, for example as an injection-molded or cast plastic part. The two side pieces 14, 16, connected in one piece with each other, can be produced in one piece together with the fixing plate 40, the closure plate 20 arranged on the free edge of the fixing plate 40, and also with the cover 18 which is connected with the fixing plate 40 in the region of the bending line 42. For this purpose, the fixing plate 40 is produced by injection molding in a position in which the housing can be produced by means of as simple an injection mold as possible without the need of molding circumferentially closed hollow profiles. In particular, the housing can be produced in a shape in which the fixing plate 40 is situated in the extension of the two side pieces 14, 16. Apart from the cover 18 and the closure plate 20, the housing is flat in this state. Then the fixing plate 40 together with the cover 18 and the closure plate 20 is bent along the bending line 42 and in so doing, the bent sections of the housing, which in this state is present only as cast or molded raw part, representing the side pieces 14, 16. The housing now obtains the shape shown in FIG. 4. At the same time, the bead 46 of the gas bag 12 is placed into the groove 44, and the tongues 48 of the gas bag 12 are slipped over the projections 26. Then the side piece 16 of the gas bag is bent over along the bending line 34, so that the projections 26, 30 engage into the openings 28, 32. When the projections 26, 30 are then firmly connected with the side piece 16, a gas bag module is produced which is closed on all sides, in which no covering is necessary which protects the housing with respect to the exterior and holds the gas bag in the housing.

The cover 18 and the closure plate 20 keep the side pieces 14, 16 to constant distance and connect them. On bending the molded or cast raw part, the chamber for accommodating the gas bag 12 and the flow channel 22 are closed.

Figure 5:
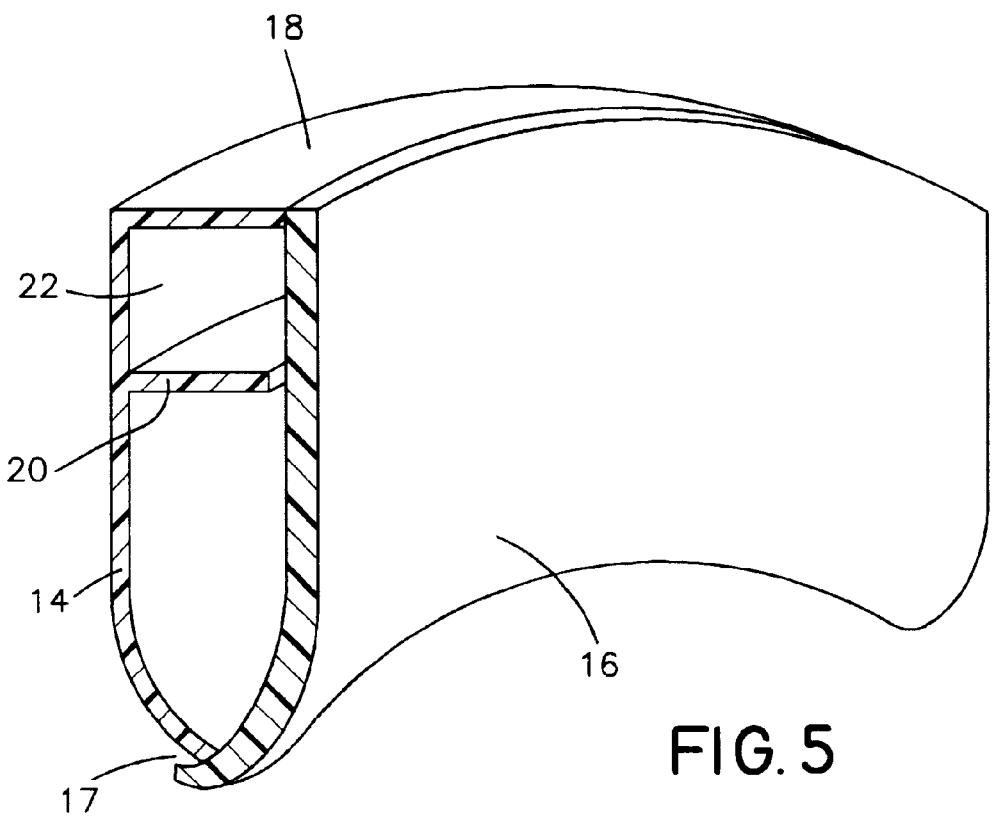
FIG. 5 shows in a sectional perspective view a housing which can be used in a second embodiment of the gas bag module according to the invention.

In FIG. 5 a housing is shown for a gas bag module according to a second embodiment of the invention. In contrast to the first embodiment, the two side pieces 14, 16 are constructed here as separate pieces, the cover 18 and the closure plate 20 being constructed in one piece with the side piece 14. In this embodiment too, the side piece 16 is connected with the cover 18 and with the closure plate 20, for example by means of the projections and openings known from the first embodiment, which are not shown in FIG. 5, however. On the side of the housing facing away from the flow channel 22, the two side pieces 14, 16 are fastened to each other by means of a latching connection 17. This latching connection is released on activation of the gas bag, so that it can unfold.

Figure 6:
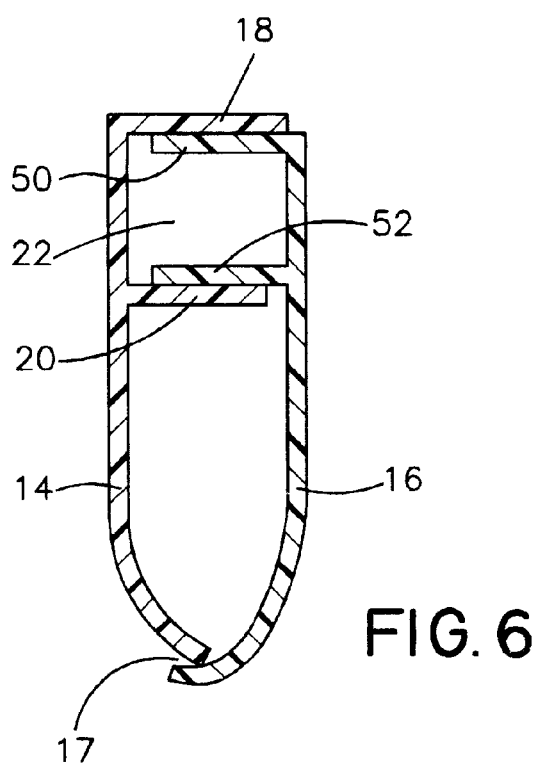
FIG. 6 shows in a sectional view a variant of the housing shown in FIG. 5.

In FIG. 6 a variant of the housing shown in FIG. 5 is illustrated. Also in this variant, the cover 18 and the closure plate 20 are constructed in one piece with the side piece 14. In addition, however, reinforcement elements 50, 52 are constructed on the side piece 16, which lie against the cover 18 and the closure plate 20, respectively, and reinforce the flow channel 22. The reinforcement elements 50, 52 can be plate-shaped in particular, the reinforcement element 52 being constructed such that the passages 24 are not closed, which make possible an overflowing of the compressed gas from the flow channel 22 into the gas bag 12.

In the embodiment according to FIGS. 5 and 6, the two side pieces 14, 16 can consist of different materials so that an adaptation to the differing stresses of the gas bag module is possible.

What is claimed is:

1. A gas bag module for a vehicle occupant restraint system, said module comprising:
   an elongated housing which comprises two side pieces and in which a flow channel for compressed gas is provided;
   a gas bag which can be transferred by means of said compressed gas from a folded position into an unfolded position and which is accommodated in said housing in its folded position, and a closure plate constructed in one piece with one of said side pieces;
   said flow channel being formed by said side pieces of said housing and by said closure plate; and
   said closure plate having passages for said compressed gas, said two side pieces touching each other on a side of said gas bag facing away from said flow channel, so that said housing is closed there.

2. The gas bag module according to claim 1, wherein said two side pieces are constructed in one piece with each other and wherein between the two side pieces a tear line is preformed on said side of said gas bag facing away from said flow channel.

3. The gas bag module according to claim 1, wherein said two side pieces are constructed as separate parts and are fastened to each other on said side of said gas bag facing away from said flow channel.

4. The gas bag module according to claim 3, wherein said two side pieces are fastened to each other by means of a latching connection on the side of said gas bag facing away from said flow channel.

5. The gas bag module according to claim 3, wherein said two side pieces consist of different materials.

6. The gas bag module according to claim 1, wherein said housing is constructed of a plastic material.

7. The gas bag module according to claim 6, wherein said plastic material is one of an injection-molded plastic material and a cast plastic material.

8. The gas bag module according to claim 1, wherein said closure plate is attached to the one side piece not formed with said closure plate by a clip connection.

9. A gas bag module for a vehicle occupant restraint system, said module comprising:
   an elongated housing which comprises two side pieces and in which a flow channel for compressed gas is provided;

a gas bag which can be transferred by means of said compressed gas from a folded position into an unfolded position and which is accommodated in said housing in its folded position; and a closure plate constructed in one piece with one of said side pieces;

said flow channel being formed by said side pieces of said housing and by said closure plate, said closure plate having passages for said compressed gas, wherein projections are formed on said closure plate, said projections engaging into openings constructed in one of said side pieces.

10. The gas bag module according to claim 9, wherein said gas bag is provided with tongues into which said projections engage.

11. A gas bag module for a vehicle occupant restraint system, said module comprising:

an elongated housing which comprises two side pieces and in which a flow channel for compressed gas is provided;

a gas bag which can be transferred by means of said compressed gas from a folded position into an unfolded position and which is accommodated in said housing in its folded position; and a closure plate constructed in one piece with one of said side pieces;

said flow channel being formed by said side pieces of said housing and by said closure plate, said closure plate having passages for said compressed gas, wherein on one of said side pieces a fixing plate is provided, said fixing plate being connected to said one side piece by means of a bending line which extends parallel to said one side piece, said fixing plate being provided with a groove to receive an edge of said gas bag, said closure plate being provided on an edge of said fixing plate facing away from said bending line.

12. A gas bag module for a vehicle occupant restraint system, said module comprising:

an elongated housing which comprises two side pieces and in which a flow channel for compressed gas is provided;

a gas bag which can be transferred by means of said compressed gas from a folded position into an unfolded position and which is accommodated in said housing in its folded position; and a closure plate constructed in one piece with one of said side pieces;

said flow channel being formed by said side pieces of said housing and by said closure plate, said closure plate having passages for said compressed gas, the other of said side pieces not being provided with said closure plate, said other of said side pieces being provided with reinforcement elements which reinforce said flow channel.

13. A method for producing a gas bag module for a vehicle occupant restraint system, said module comprising:

an elongated housing which comprises two side pieces and in which a flow channel for compressed gas is provided;

a gas bag which can be transferred by means of said compressed gas from a folded position into an unfolded position and which is accommodated in said housing in its folded position; and a closure plate constructed in one piece with one of said side pieces, the other of said side pieces not being constructed with said closure plate;

said flow channel being formed by said side pieces of said housing and by said closure plate, said closure plate having passages for said compressed gas, said housing being constructed of plastic and being a shaped part in one piece, said method comprising the steps of:

providing said housing without a closed profile in an open position;

bending said housing to form said flow channel; and connecting bent sections of said housing.

14. The method according to claim 13, wherein said step of bending said housing comprises bending said side pieces to form said bent sections, said side pieces being kept a constant distance from each other via said closure plate.

15. The method according to claim 14, wherein said step of connecting said bent sections of said housing comprises attaching said closure plate to the other of said side pieces by a clip connection.

16. A method for producing a gas bag module, said module comprising:

an elongated housing which comprises two side pieces and in which a flow channel for compressed gas is provided;

a gas bag which can be transferred by means of said compressed gas from a folded position into an unfolded position and which is accommodated in said housing in its folded position; and a closure plate constructed in one piece with one of said side pieces;

said housing having an open state immediately after its production in which state said gas bag can be inserted into said housing, and having a closed state after insertion of said gas bag in which state the gas bag module is to be attached to a vehicle;

said flow channel being formed by said side pieces of said housing and by said closure plate, said closure plate having passages for said compressed gas, said method comprising the steps of:

constructing said housing of one of injection molded plastic material and cast plastic material;

providing said housing in the open state free from closed profiles;

inserting said gas bag into said housing in said folded position;

closing said housing, said flow channel being likewise closed by the closing action; and connecting said side pieces, said side pieces lying opposite each other by said closing action, said side pieces being connected to each other in such a way that they are kept to a constant distance.

17. The method according to claim 16, wherein said step of closing said housing further comprises closing a chamber for accommodating said gas bag.

18. The method according to claim 16, wherein said step of connecting said side pieces further comprises connecting said side pieces to each other with said closure plate.

19. The method according to claim 18, wherein said step of connecting said side pieces comprises connecting said side pieces to each other by a cover formed in one piece with one of the side pieces.

* * * * *